United States Patent [19]

Edwards et al.

[11] Patent Number: 4,761,777
[45] Date of Patent: Aug. 2, 1988

[54] OPTICAL MULTIPLEX SYSTEMS

[75] Inventors: Roger A. Edwards; Peter T. Gardiner, both of Cheltenham, England

[73] Assignee: Smiths Industries Public Limited Company, London, England

[21] Appl. No.: 933,948

[22] Filed: Nov. 24, 1986

[30] Foreign Application Priority Data

Dec. 18, 1985 [GB] United Kingdom ............... 85 31150

[51] Int. Cl.⁴ .............................................. H04B 9/00
[52] U.S. Cl. ...................................... 370/3; 455/607; 455/612; 455/617
[58] Field of Search ............... 455/606, 607, 617, 619, 455/609, 610, 612; 370/3

[56] References Cited

U.S. PATENT DOCUMENTS

| | | | |
|---|---|---|---|
| 3,316,348 | 4/1967 | Hufnagel et al. | 455/605 |
| 3,617,710 | 11/1971 | Honeycutt et al. | 370/3 |
| 3,873,825 | 3/1975 | Jones et al. | 370/3 |
| 4,406,003 | 9/1983 | Eberly et al. | 370/3 |
| 4,543,961 | 10/1985 | Brown | 455/605 |

FOREIGN PATENT DOCUMENTS

| | | |
|---|---|---|
| 0054363 | 6/1982 | European Pat. Off. . |
| 0091271 | 10/1983 | European Pat. Off. . |
| 1161860 | 8/1969 | United Kingdom . |
| 1540907 | 2/1979 | United Kingdom . |
| 2161931 | 1/1986 | United Kingdom . |
| 2165115A | 4/1986 | United Kingdom ............... 455/610 |

Primary Examiner—Robert L. Griffin
Assistant Examiner—L. Van Beek
Attorney, Agent, or Firm—Pollock, VandeSande and Priddy

[57] ABSTRACT

An optical multiplex system has an LED which supplies broad band optical radiation to one end of a fiber-optic cable that extends, via displacement transducers connected in series, to a receiver. Each transducer has a movable filter plate with a neutral region and a region that attenuates radiation in different respective narrow bands of wavelengths. The receiver includes a detector that receives radiation from the other end of the cable via a filter. The filter has a variable narrow band transmission characteristic so that radiation in either one of the narrow bands can be selected and supplied to the detector which thereby gives an output representative of the state of the selected transducer.

8 Claims, 2 Drawing Sheets

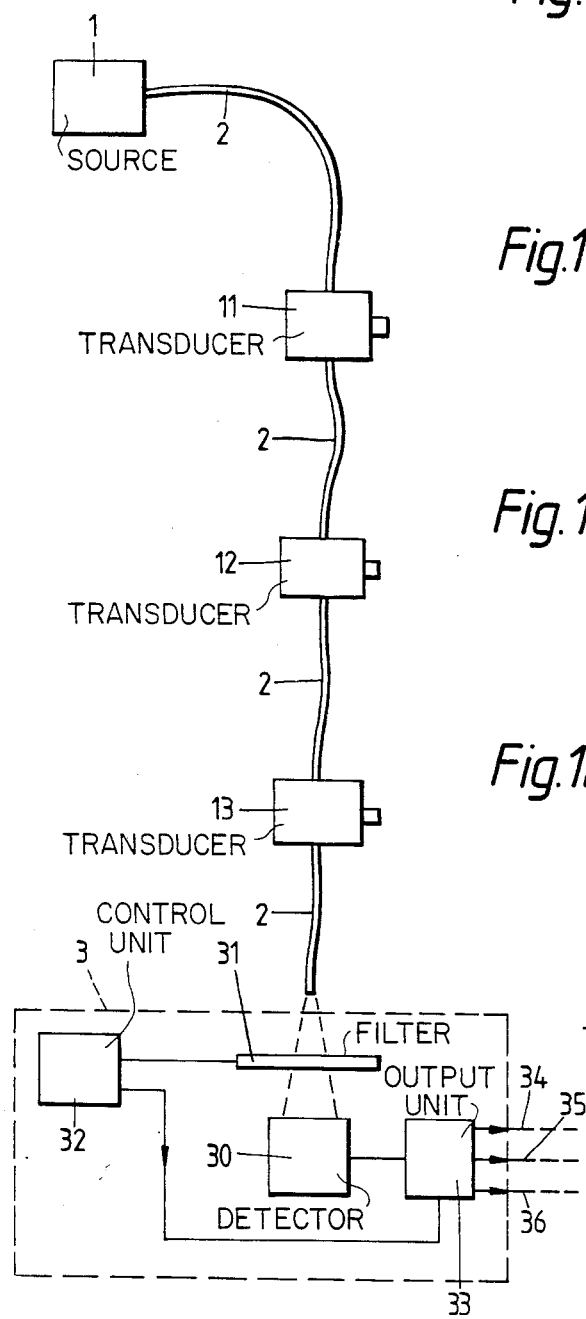
Fig. 1.
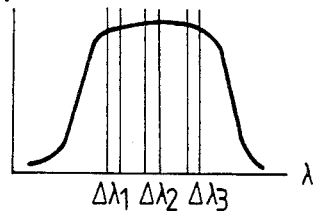
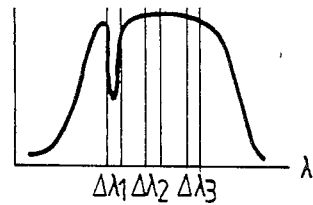
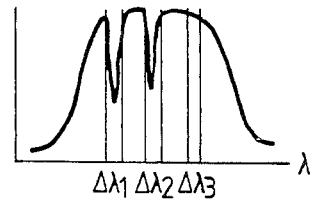
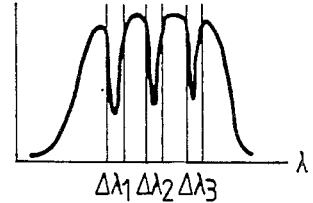
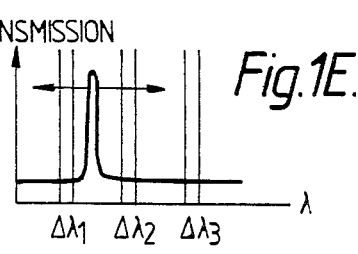

OPTICAL MULTIPLEX SYSTEMS

BACKGROUND OF THE INVENTION

This invention relates to optical multiplex systems and methods.

Optical transducers are becoming more common, such as for detecting various functions in aircraft. Because of the large number of transducers that may be necessary in a system, it is desirable to multiplex them in order to reduce the number of cables and connections in the system.

Commonly, multiplexing is achieved in one of two different ways. In time-division multiplex systems, each transducer provides an output at a different time and a de-multiplexer is used to provide outputs in respect of each transducer by interrogating each transducer in turn when that transducer is providing its output. Time-division multiplex systems are, however, difficult to use in optical systems because of the difficulty of triggering the transducers to provide an output only at specified times.

In optical frequency—or wavelength-division multiplex systems, the transducers are responsive only to radiation within a specific band of wavelengths and each transducer is responsive to different bands. Such systems include several radiation sources that each supply the radiation to respective ones of the transducers, and several receivers responsive to radiation in the respective narrow bands so that the output of each transducer can be continuously monitored. While wavelength-division multiplex systems can function satisfactorily, they can be complex because of the need to provide individual radiation sources associated with each transducer. Furthermore, failure of one source may go undetected since it is indistinguishable from a low output of its associated transducer.

SUMMARY OF THE INVENTION

It is an object of the present invention to provide an optical multiplex system and method by which these disadvantages can be alleviated.

According to one aspect of the present invention there is provided an optical multiplex system including a source of optical radiation adapted to emit radiation within a broad band of wavelengths, a plurality of transducer devices arranged to receive radiation from said source, the transducer devices being responsive to radiation within respective narrow bands of wavelength that differ from one another within said broad band, optical radiation receiver means arranged to respond to radiation within each of said narrow bands of wavelength and produce respective outputs in accordance therewith, and optical radiation guide means arranged to transmit radiation from the transducer devices to the receiver means.

The transducer devices preferably include a movable member with different radiation characteristics in different regions of the member such that movement of said member alters the characteristics of radiation output by the transducer device. The movable member may have one region with a neutral characteristic and another region which attenuates radiation in a said respective narrow band of wavelength, or may have a radiation characteristic that varies progressively over the member. The movable member is preferably optically transparent and has different radiation transmission characteristics in different regions over its surface.

The receiver means preferably includes detector means responsive to each of said narrow bands of wavelength, and filter means intermediate said detector means and said optical radiation guide means, said filter means being adjustable selectively to pass to said detector means only radiation within any individual one of said narrow bands of wavelengths.

The filter means may be an electro-optical device having a narrow transmission band which can be changed to different wavelengths by electrical control, or the said filter means may have different transmission characteristics in different regions of its surface, the receiver means including means for displacing the filter means to select the narrow band of wavelengths passed to the detector means.

The optical radiation guide means preferably includes a fibre-optic cable. The receiver means may be arranged to provide outputs on separate lines in respect of each said transducer device. The said source may include a light-emitting diode.

According to another aspect of the present invention there is provided a method of multiplexing an optical system including the steps of: emitting radiation within a broad band of wavelengths; supplying said radiation to each of a plurality of transducer devices via a single optical radiation guide, said transducer devices being arranged to respond to radiation within respective narrow bands of wavelength that differ from one another within said broad band; supplying radiation from said transducer devices to a single optical radiation guide; and detecting radiation from said optical radiation guide output from said transducers in each of said narrow bands of wavelengths.

An optical multiplex system and its method of operation, in accordance with the present invention, will now be described, by way of example, with reference to the accompanying drawings.

BRIEF DESCRIPTION OF THE DRAWINGS

FIG. 1 shows the system schematically;

FIGS. 1A to 1D show radiation spectra at different points in the system;

FIG. 1E shows a transmission characteristic of a filter in a receiver unit of the system;

DESCRIPTION OF THE PREFERRED EMBODIMENTS

With reference first to FIG. 1, the system includes an optical radiation source 1 which supplies radiation via a fibre-optic cable 2 to a receiver unit 3. Three transducers 11, 12 and 13 are connected in series along the cable 2 and modify the radiation transmitted to the receiver unit in accordance with the functions sensed by the transducers.

The source 1 emits radiation over a relatively broad band of wavelengths, as shown in the graph of FIG. 1A, which may be in the infra red, visible or ultra violet parts of the spectrum. The source 1 is preferably provided by a wavelength stable device such as a light-emitting diode. It should be noted that only one source of radiation is needed.

The fibre-optic cable 2 is of conventional form and provides a single optical radiation guide between the source 1 and the receiver unit 3 via the three transducers 11 to 13. Other forms of optical radiation guides can be used instead of a fibre-optic cable.

Figure 2:
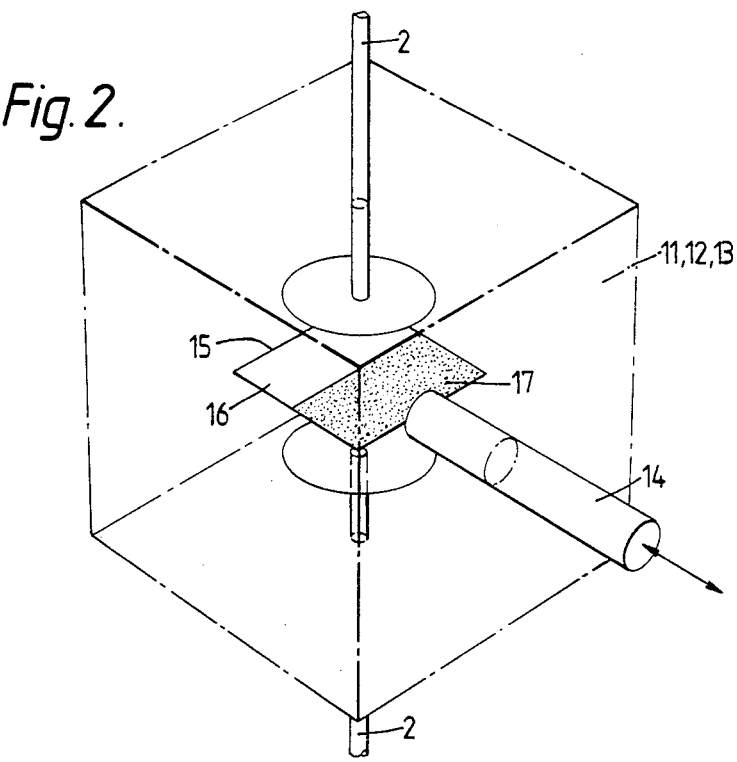
FIG. 2 shows a transducer of the system schematically in perspective.
Figure 2A:
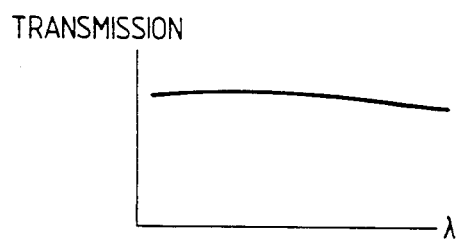
FIG. 2A shows the transmission characteristic of a neutral region of a filter plate in the transducer.
Figure 2C:
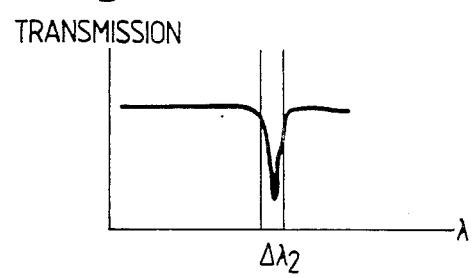
FIGS. 2B to 2D show the transmission characteristics of the filtering region of each transducer.
Figure 2B:
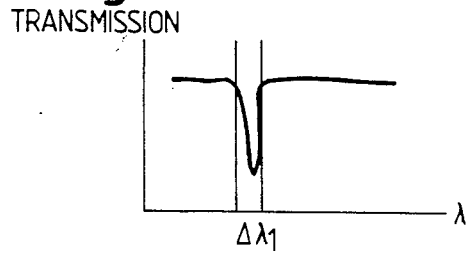
Figure 2D:
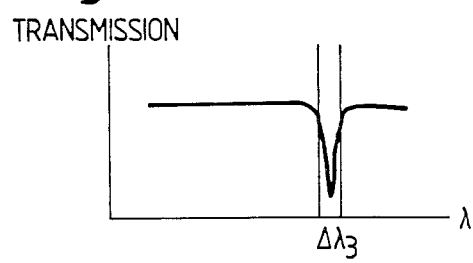

The transducers 11 to 13 may be of many different forms. In the present example, the transducers 11 to 13 are displacement transducers arranged to respond to the position of a valve member and are illustrated in FIG. 2. Each transducer 11 to 13 has an input shaft 14 that is coupled at one end to the valve member (not shown) and that is displaceable along its length in accordance with displacement of the valve member. At the other end of the shaft 14 is mounted a filter plate or similar member 15 having two distinct regions 16 to 17. One region 16 of the plate 15 is neutrally transparent to radiation within the band-width emitted by the source 1, as shown in the transmission characteristic in FIG. 2A. The other region 17 of the filter plate 15 in each transducer 11 to 13 differs one from the other, being highly transparent to radiation except that within different narrow bands of wavelength $\Delta\lambda_1$, $\Delta\lambda_2$ and $\Delta\lambda_3$ respectively, where the filter of each transducer has a low transmission. The transmission characteristics of the filtering regions 17 of the three transducers 11 to 13 are shown in FIGS. 2B, 2C and 2D respectively. These three narrow bands of wavelength fall within the broad band of wavelengths emitted by the source 1.

The fibre-optic cable 2 extends through each transducer 11 to 13, the cable being interrupted an opposite sides of the filter plate 15 so that all radiation transmitted on the cable 2 downstream of the transducer 11 to 13 has been passed through either the neutral region 16 or the filtering region 17 of the filter plate 15, according to the position of the shaft 14.

The wavelength spectra of radiation transmitted along the cable 2 after each transducer 11 to 13 is modified in the manner shown in FIGS. 1B to 1D respectively, assuming that the shaft 14 of each transducer is pushed in, so that the radiation passes through the filtering region 17 of each respective filter plate 15. In this example, the radiation supplied to the sensor unit 3 has the spectrum shown in FIG. 1D in which the wavelengths over the bands $\Delta\lambda_1$, $\Delta\lambda_2$ and $\Delta\lambda_3$ have been substantially attenuated.

The receiver unit 3 includes a detector 30, such as a photodiode, which is responsive to at least the wavelengths covering the narrow bands $\Delta\lambda_1$, $\Delta\lambda_2$ and $\Delta\lambda_3$. The receiver unit 3 also includes a variable filter 31 located intermediate the detector 30 and the end of the fibre-optic cable 2 so that all radiation emitted by the end of the cable passes through the filter before reaching the detector.

The filter 31 is an electro-optical device with a narrow transmission band which can be displaced to different wavelengths by electrical control from a unit 32, as shown in the transmission characteristic of FIG. 1E. Alternatively, the filter 31 could have different transmission characteristics in different regions of its surface, the filter itself being displaced so that radiation is passed through regions with different transmission characteristics. The control unit 32 also supplies signals to an output unit 33 which receives electrical output signals from the detector 30 and provides output signals on three output lines 34 to 36 in respect of the response of each transducer 11 to 13 respectively.

In operation, it will be seen that the level of radiation supplied to the receiver unit 3 within the bands $\Delta\lambda_1$, $\Delta\lambda_2$ and $\Delta\lambda_3$ will be dependent on the position of the shaft 14 of each transducer 11 to 13. The control unit 32 varies the characteristics of the filter 31 so that its band pass is displaced periodically and successively between wavelengths covering the bands $\Delta\lambda_1$, $\Delta\lambda_2$ and $\Delta\lambda_3$. The detector 30 thereby receives radiation successively from each of these three bands and provides outputs to the output unit 33 accordingly. The signal supplied to the output unit 33 from the control unit 32 indicates which wavelength band is being passed by the filter 31 and hence identifies the transducer from which the signals are being received. The output unit 33, after any appropriate amplification or scaling, supplies a signal to the appropriate output line 34, 35 or 36 according to the position of the associated transducer shaft. The signals on lines 34 to 36 may be simple ON/OFF signals where it is only desired to know whether the valve associated with each transducer 11 to 13 is on or off. In other applications the transducer may respond to change in a variable value in which case analogue or digital signal representations of this value are provided on the output lines 34 to 36. In this example, the filtering region of the filter plate in each transducer may vary progressively over its surface so that a variable transmission is produced in accordance with the position of the filter plate, that is, the degree of attenuation within the narrow band of wavelengths varies over the surface of the filter plate.

The transducers may be responsive to many different variables such as, for example, temperature, pressure, attitude and so on.

The transducers need not have a movable member but could have some other device that varies the characteristic of radiation passed through the transducer in accordance with the variable being sensed by the transducer. For example, the transducer could include a substance which changes chemically with temperature change such as to vary its radiation transmission characteristics. Where a movable member is used this could be reflective rather than transmissive.

It will be seen that, because the outputs of the transducers are monitored in turn one after the other, this provides a discontinous output. However, the sampling rate can be high and this is satisfactory for all cases except where very rapidly changing variables need to be monitored. The arrangement of the present invention has the advantage of only requiring a single source and a single detector thereby avoiding complexity. Furthermore, failure of the source is rapidly apparent by a total loss of signals to the sensor. This enables remedial action to be taken such as by automatically bringing a back-up system into operation.

What we claim is:

1. An optical multiplex system comprising: a fiber-optic cable; a source of optical radiation, said source supplying radiation within a broad band of wavelengths to one end of said cable; a plurality of transducer devices arranged in series one after the other along said cable, each of said transducer devices having a respective filter that is movable relative to a path of radiation through said cable, each filter absorbing radiation in a respective narrow band of wavelength that differs from one another within said broad band, and each filter transmitting radiation passed through said filter to other transducer devices in the series in accordance with the position of said filter relative to said path of radiation;

and optical radiation receiver means mounted to receive radiation emitted from the other end of said cable after passing through all said transducer devices, said receiver means responding to radiation within each of the said narrow bands of wavelength and producing respective outputs in accordance therewith.

2. An optical multiplex system according to claim 1, wherein each said movable filter has one region of a neutral characteristic and another region which attenuates radiation in a said respective narrow band of wavelength.

3. An optical multiplex system according to claim 1, wherein each said movable filter has a radiation characteristic that varies progressively over the member.

4. An optical multiplex system according to claim 1, wherein each said movable filter is optically transparent and has different radiation transmission characteristics in different regions over its surface.

5. An optical multiplex system according to claim 1, wherein the said receiver means includes detector means responsive to each of said narrow bands of wavelength, filter means intermediate said detector means and said fiber optic cable, and means for adjusting said filter means to pass to said detector means selectively only radiation within an individual one of said narrow bands of wavelengths.

6. An optical multiplex system according to claim 6, wherein the said filter means has a narrow transmission band which can be changed to different wavelengths by electrical control.

7. An optical multiplex system according to claim 6, wherein the said filter means has different transmission characteristics in different regions of its surface, and wherein the receiver means includes means for displacing the filter means to select the narrow band of wavelengths passed to the detector means.

8. An optical multiplex system comprising: a source of optical radiation, said source emitting radiation within a broad band of wavelengths; a plurality of transducer devices; optical radiation receiver means; fibre-optic cable means interconnecting said transducer devices in series with one another between said source and said receiver means such that radiation is supplied to said receiver means via each transducer device; a filter plate in each said transducer device that is adapted to attenuate radiation in a different, respective narrow band of wavelengths within the said broad band of wavelengths; means moving said filter plate into or out of a path of radiation in said transducer device such that radiation output from the transducer device either has said respective narrow band of wavelengths attenuated or not, according to the position of said filter plate relative to the path of radiation, and wherein said receiver means includes a detector that is responsive to each of said narrow bands of wavelength, filter means intermediate said detector and the fibre-optic cable means, and means for adjusting said filter means to pass to said detector means selectively only radiation within any individual one of said narrow bands of wavelengths.

* * * * *